(12) United States Patent
Wang et al.

(10) Patent No.: US 12,444,816 B2
(45) Date of Patent: Oct. 14, 2025

(54) INJECTION NOZZLE AND INJECTION APPARATUS CONTAINING SAME

(71) Applicant: CONTEMPORARY AMPEREX TECHNOLOGY (HONG KONG) LiMiTED, Hong Kong (CN)

(72) Inventors: Dongfeng Wang, Ningde (CN); Caixia Huang, Ningde (CN); Zhiming Wang, Ningde (CN); Siyu Miao, Ningde (CN); Guanzhou Li, Ningde (CN); Minghao Tang, Ningde (CN); Shengwu Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/666,815

(22) Filed: May 17, 2024

(65) Prior Publication Data

US 2024/0304964 A1   Sep. 12, 2024

Related U.S. Application Data

(63) Continuation of application No. PCT/CN2022/142776, filed on Dec. 28, 2022.

(30) Foreign Application Priority Data

Jan. 4, 2022   (CN) .......................... 202210002258.X

(51) Int. Cl.
*H01M 50/609*   (2021.01)

(52) U.S. Cl.
CPC ................................ *H01M 50/609* (2021.01)

(58) Field of Classification Search
CPC .......................... B67C 3/2608; H01M 50/609
See application file for complete search history.

(56) References Cited

U.S. PATENT DOCUMENTS 4,492,253 A * 1/1985 Raftis ................... F16K 15/147
                                                                137/849
7,445,028 B1 * 11/2008 Aanonsen ............. F16K 15/147
                                                                137/849

FOREIGN PATENT DOCUMENTS

| CN | 203218393 U | 9/2013 |
| CN | 106241700 A | 12/2016 |

(Continued)

OTHER PUBLICATIONS

International Search Report received in the corresponding international application PCT/CN2022/142776, mailed on Mar. 23, 2023.

(Continued)

*Primary Examiner* — Timothy L Maust
(74) *Attorney, Agent, or Firm* — K&L Gates LLP

(57) ABSTRACT

Some embodiments of this application provide an injection nozzle and an injection apparatus containing same. The injection nozzle includes a body, an injection pipe, and a baffle. The body contains a channel arranged along a height direction of the injection nozzle. A first outlet is disposed at a lower part of the channel. The injection pipe is threaded through the channel in a manner of reciprocating movement along the height direction. The baffle is connected to the body and configured to cover the first outlet when a lower end portion of the injection pipe is higher than the first outlet, and be propped open by the injection pipe when the lower end portion of the injection pipe is lower than the first outlet.

13 Claims, 3 Drawing Sheets

(56) References Cited

FOREIGN PATENT DOCUMENTS

| | | |
|---|---|---|
| CN | 206301868 U | 7/2017 |
| CN | 206490131 U | 9/2017 |
| CN | 107394106 A | 11/2017 |
| CN | 206742375 U | 12/2017 |
| CN | 108011072 A | 5/2018 |
| CN | 207303224 U | 5/2018 |
| CN | 208028145 U | 10/2018 |
| CN | 106601978 B | 2/2019 |
| CN | 109390503 A | 2/2019 |
| CN | 209200060 U | 8/2019 |
| CN | 110600670 A | 12/2019 |
| CN | 110803672 A | 2/2020 |
| CN | 210113656 U | 2/2020 |
| JP | 2003288890 A | 10/2003 |
| JP | 2005190689 A | 7/2005 |

OTHER PUBLICATIONS

The extended European search report received in the counterpart European application 22918465.0, mailed on Nov. 25, 2024.
The first office action received in the counterpart CN application 202210002258.X, dated May 24, 2025, 13 pages with English translation.

\* cited by examiner

INJECTION NOZZLE AND INJECTION APPARATUS CONTAINING SAME

CROSS-REFERENCE TO RELATED APPLICATIONS

This application is a continuation of International Application No. PCT/CN2022/142776, filed Dec. 28, 2022, which claims priority to Chinese Patent Application No. 202210002258.X, filed on Jan. 4, 2022 and entitled "INJECTION NOZZLE AND INJECTION APPARATUS CONTAINING SAME", which are incorporated herein by reference in their entireties.

TECHNICAL FIELD

This application relates to the field of battery technology, and in particular, to an injection nozzle and an injection apparatus containing same.

BACKGROUND

The background section merely provides background information related to this application and is not necessarily prior art.

In the battery production process, it is necessary to inject an electrolyte solution as a conductive medium into a housing of a battery cell. Generally, an opening for electrolyte injection is created at one end of the housing of the battery cell. In a process of injecting the electrolyte solution, an injection pump extracts the electrolyte solution and injects the electrolyte solution from the opening into the battery cell through the injection nozzle, and then the opening is sealed. However, in some cases, when the electrolyte solution is injected by using an injection nozzle, residual electrolyte solution is prone to adhere to a rubber inner wall of the injection nozzle. The residual electrolyte solution crystallizes, resulting in pollution caused by the electrolyte solution. Therefore, how to reduce the pollution caused by the residual electrolyte solution is an urgent technical problem to be solved in this field.

SUMMARY

An objective of some embodiments of this application is to provide an injection nozzle and an injection apparatus containing same to reduce pollution caused by residual liquid. Specific technical solutions are as follows:

An embodiment in a first aspect of this application provides an injection nozzle. The injection nozzle includes a body, an injection pipe, and a baffle. The body contains a channel arranged along a height direction of the injection nozzle. A first outlet is disposed at a lower part of the channel. The injection pipe is threaded through the channel in a manner of reciprocating movement along the height direction. The baffle is connected to the body and configured to cover the first outlet when a lower end portion of the injection pipe is higher than the first outlet, and be propped open by the injection pipe when the lower end portion of the injection pipe is lower than the first outlet.

In the injection nozzle according to an embodiment in the first aspect of this application, the injection pipe can move reciprocally in the channel in the body along the height direction of the injection nozzle. A first outlet is disposed at the lower part of the channel. The baffle is connected to the body and configured to cover the first outlet when a lower end portion of the injection pipe is higher than the first outlet, and be propped open by the injection pipe when the lower end portion of the injection pipe is lower than the first outlet. In this way, when a liquid needs to be injected, the first outlet of the injection nozzle is aligned with an injection port of the chamber to be filled, and the injection pipe is moved to prop the baffle open, so that the lower end portion of the injection pipe passes from the first outlet out of the body, that is, extends to the injection port of the chamber to be filled. The liquid-to-be-injected is conveyed from the upper end portion of the injection pipe to the lower end portion of the injection pipe, so as to enter the chamber to be filled and implement the injection of the liquid. After completion of the injection, the injection pipe is moved back so that the lower end portion is restored to the position above the first outlet. At this time, the baffle covers the first outlet to block the residual liquid dripping from the lower end portion of the injection pipe, thereby reducing the impact of the residual liquid on the external environment and other objects and reducing pollution. In addition, by conveying the liquid-to-be-injected through a movable injection pipe, the liquid-to-be-injected is prevented from adhering to the inner wall of the body. Especially, for a corrosive liquid-to-be-injected, it is convenient to replace the injection pipe with an injection pipe made of an appropriate material, thereby enhancing versatility and maintainability of the injection nozzle.

In some embodiments of this application, the injection nozzle further includes a spring. The spring is disposed between the injection pipe and the body along an axial direction of the injection pipe and is configured to elastically deform when the injection pipe moves downward relative to the body. With the spring disposed between the injection pipe and the body along the axial direction of the injection pipe, when the liquid needs to be injected, a force is applied to the injection pipe so that the injection pipe overcomes the elastic force of the spring and moves downward to prop the baffle open. At this time, the lower end portion of the injection pipe extends from the first outlet to the injection port of the chamber-to-be-filled to implement liquid injection. After completion of the injection, the force applied to the injection pipe is canceled, so that the spring is restored to an original state due to elasticity. At the same time, the spring drives the injection pipe to move upward to automatically restore the injection pipe to the original position, thereby making the operation of the injection process simpler. The quick restoration of the injection pipe to the original position can more effectively reduce the risk that the residual liquid accumulated at the lower end portion of the injection pipe drips down onto other objects.

In some embodiments of this application, the injection nozzle further includes a first extension portion connected to the injection pipe. The first extension portion extends outward to a wall of the injection pipe along a diameter direction of the injection pipe. The first extension portion is connected to one end of the spring. The first extension portion, which extends outward to the wall of the injection pipe along the diameter direction of the injection pipe, is connected to one end of the spring, and the first extension portion is perpendicular to the axis of the injection pipe. In this way, it is more convenient to mount the spring and position the spring between the injection pipe and the body along the axial direction of the injection pipe. In addition, during the downward movement of the injection pipe relative to the body, the first extension portion is able to exert a pressure or tension on the spring connected to the first extension portion, so as to deform the spring elastically.

In some embodiments of this application, the injection nozzle further includes a fixed base disposed opposite to the first extension portion. The fixed base is fixed to the body and connected to another end of the spring. By disposing the fixed base opposite to the first extension portion, the other end of the spring is connected to the fixed base. Because the fixed base is fixed to the body and immovable, when a force is applied to the injection pipe to move the injection pipe downward, the first extension portion drives an end of the spring connected to the first extension portion to move toward (or away from) the fixed base, so as to compress (or stretch) the spring to deform the spring elastically. For example, if the fixed base is disposed on the lower side that is directly opposite to the first extension portion, the first extension portion exerts a pressure on the spring when the injection pipe moves downward, so that the spring is compressed between the first extension portion and the fixed base. When the external force is removed, one end of the spring rebounds upward against the first extension portion, so that the injection pipe moves upward and returns to the original position. The original position may be understood as a position of the injection pipe when the spring is in its original state (without deforming elastically) or is not driven by an external force.

In some embodiments of this application, the injection nozzle further includes a second extension portion. One end of the second extension portion is connected to the first extension portion. Another end of the second extension portion is configured to touch the fixed base after the injection pipe moves downward for a preset distance. The second extension portion can fix the distance of downward movement of the injection pipe. The position of the lower end portion of the injection pipe extending to the injection port is fixed as soon as the other end of the second extension portion touches the fixed base, that is, as soon as the lower end portion of the injection pipe props the baffle open, thereby preventing an excessive length by which the injection pipe extends to the injection port. The excessive length of extension causes the wall of the injection pipe to touch the liquid-to-be-injected or touch the injection port.

In some embodiments of this application, the injection nozzle further includes a limiting cylinder. The limiting cylinder is disposed in the body and configured to touch the wall of the injection pipe and/or a sidewall of the second extension portion. By disposing the limiting cylinder in the body and letting the limiting cylinder touch the wall of the injection pipe and/or the sidewall of the second extension portion, the steadiness of the reciprocating movement of the injection pipe along the height direction of the injection nozzle is improved, thereby preventing the lower end portion of the injection pipe from scratching the sidewall of the injection port due to wobbling after extending to the injection port.

In some embodiments of this application, the limiting cylinder is further configured to touch the first extension portion. By causing the limiting cylinder to touch the first extension portion, the injection pipe can be automatically restored to and reside in the original position more smoothly after the external force applied to the injection pipe is removed.

In some embodiments of this application, the baffle is detachably connected between the body and the fixed base. Because the baffle is configured to block the residual liquid that drips from the lower end portion of the injection pipe, the residual liquid often touches and adheres to the surface of the baffle. Especially, with a corrosive liquid, the baffle is prone to be damaged. Therefore, by connecting the baffle detachably between the body and the fixed base, it is more convenient to clean and maintain the baffle and replace the baffle.

In some embodiments of this application, the baffle includes a fixing ring and a plurality of sectorial elastic sheets. A plurality of first through-holes are created on the fixing ring. Curved edges of the plurality of sectorial elastic sheets are embedded in the fixing ring and connected to the fixing ring by a bolt threaded through the first through-hole. The bolt is also threaded through the body and the fixed base. By disposing the fixing ring and the plurality of sectorial elastic sheets, on the one hand, it is more convenient to fix the baffle to a position of the body at which the first outlet can be covered. On the other hand, the sectorial elastic sheets of the baffle can be automatically restored to the original state when the lower end portion of the injection pipe moves upward to a position higher than the first outlet. In this way, upon completion of the injection, the injection pipe is restored to the original position, and the baffle is restored to the state of covering the first outlet to block the residual liquid that drips down from the injection pipe.

In some embodiments of this application, a diversion portion is disposed on the injection pipe. A diameter of the diversion portion decreases gradually along a direction from an upper end portion of the injection pipe to the lower end portion of the injection pipe. By disposing the diversion portion with a diameter decreasing gradually along the direction from the upper end portion of the injection pipe to the lower end portion of the injection pipe, the liquid-to-be-injected in the injection pipe can centrally converge into a thin-diameter liquid column to enter the injection port after flowing top-down to the diversion portion, so as to more effectively prevent the liquid-to-be-injected from splashing down onto other components and objects.

In some embodiments of this application, the baffle includes a beveled face that fits the diversion portion. By disposing the beveled face that fits the diversion portion, the injection pipe can touch and fit the baffle and prop the baffle open more easily when the injection pipe moves downward.

An embodiment in a second aspect of this application provides an injection apparatus. The injection apparatus includes the injection nozzle according to an embodiment in the first aspect of this application.

In the injection apparatus provided in an embodiment in the second aspect of this application, the injection pipe of the injection nozzle can reciprocate in a channel in the body of the injection nozzle along the height direction of the injection nozzle. A first outlet is disposed at the lower portion of the channel, and the baffle is connected to the body and configured to cover the first outlet when the lower end portion of the injection pipe is higher than the first outlet and be propped open by the injection pipe when the lower end portion of the injection pipe is lower than the first outlet. In this way, when a liquid needs to be injected, the first outlet of the injection nozzle is aligned with an injection port of the chamber to be filled, and the injection pipe is driven to prop the baffle open, so that the lower end portion of the injection pipe passes from the first outlet out of the body, that is, extends to the injection port of the chamber to be filled. The liquid-to-be-injected is conveyed from the upper end portion of the injection pipe to the lower end portion of the injection pipe, so as to enter the chamber to be filled and implement the injection of the liquid. After completion of the injection, the injection pipe is moved back so that the lower end portion is restored to the position above the first outlet. At this time, the baffle covers the first outlet to block the residual liquid dripping from the lower end portion of the injection pipe, thereby reducing the impact of the residual liquid on the external environment and other objects and reducing pollution. In addition, by conveying the liquid-to-be-injected through a movable injection pipe, the liquid-to-be-injected is prevented from adhering to the inner wall of the body. Especially, for a corrosive liquid-to-be-injected, it is convenient to replace the injection pipe with an injection pipe made of an appropriate material, thereby enhancing versatility and maintainability of the injection nozzle.

In some embodiments of this application, the injection apparatus further includes an injection cup, a driving mechanism, and a stopper rod. The injection cup includes a chamber configured to accommodate an electrolyte solution, an upper cover disposed at one end of the chamber, and a lower cover disposed at another end of the chamber. A second through-hole is created on the lower cover. The injection pipe of the injection nozzle is fixedly threaded through the second through-hole and communicates with the chamber. A third through-hole is created on the upper cover. The driving mechanism is configured to drive the injection cup to move from a first position to a second position. The stopper rod is fixed in a position and threaded through the third through-hole. One end of the stopper rod is configured to be in close contact with an upper end portion of the injection pipe and, when the injection cup reaches the second position, be disengaged from the injection pipe.

By disposing the injection cup, the driving mechanism, and the stopper rod, when the driving mechanism is not driving the injection cup, the stopper rod is in close contact with the upper end portion of the injection pipe, so that the liquid-to-be-injected in the chamber of the injection cup is unable to flow into the injection pipe. When the driving mechanism drives the injection cup until the injection cup reaches the second position, the injection cup accordingly drives the injection pipe to move downward until the lower end portion reaches a desired position, where the injection pipe is fixedly threaded through the lower cover of the injection cup. At this time, the stopper rod is disengaged from the injection pipe, the injection pipe communicates with the chamber, and the liquid-to-be-injected flows downward from the upper end portion to the lower end portion of the injection pipe to enter the injection port, thereby implementing the liquid injection.

BRIEF DESCRIPTION OF DRAWINGS

To describe the technical solutions in some embodiments of this application or the prior art more clearly, the following outlines the drawings to be used in the description of some embodiments of this application or the prior art. Evidently, the drawings outlined below are merely a part of embodiments of this application. A person of ordinary skill in the art may derive other drawings from such drawings without making any creative effort.

LIST OF REFERENCE NUMERALS

Figure 1:
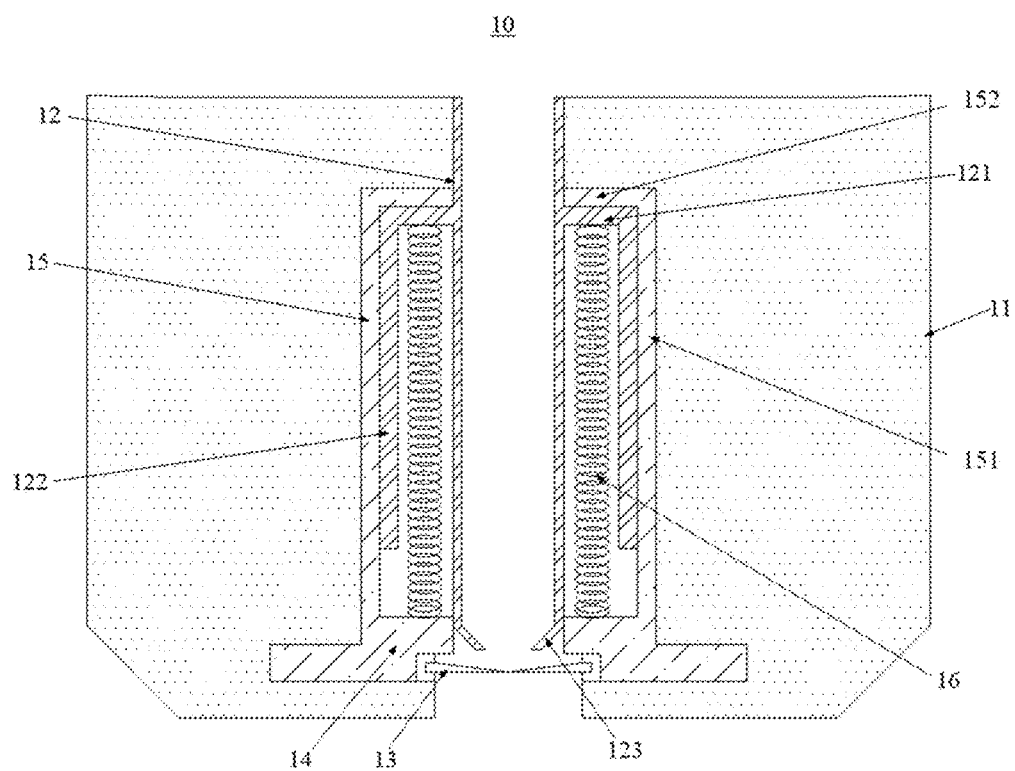
FIG. 1 is a schematic structural diagram of an injection nozzle according to an embodiment of this application.

10—injection nozzle; 11—body; 12—injection pipe; 13—baffle;

14—fixed base; 15—limiting cylinder; 16—spring;
121—first extension portion; 122—second extension portion; 123 diversion portion;
131—fixing ring; 1311—first through-hole; 132—sectorial elastic sheet; 1301—beveled face;
151—first limiting portion; 152—second limiting portion;
20—injection cup; 21—chamber; 22—upper cover; 23—lower cover;
30—stopper rod;
500—injection port.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "height", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

The battery mentioned in embodiments of this application means a unitary physical module that includes one or more battery cells to provide a higher voltage and a higher capacity. The battery may contain a plurality of battery cells. The plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box. Alternatively, the plurality of battery cells may be connected in series, parallel, or series-and-parallel pattern to form a battery in the form of battery modules first. A plurality of battery modules are then connected in series, parallel, or series-and-parallel pattern to form a whole for being accommodated in the box. The battery may further include other structures. For example, the battery may further include a busbar component configured to implement electrical connection between the plurality of battery cells. For example, the battery referred to herein may include a battery module, a battery pack, or the like.

Each battery cell may be, but is not limited to, a secondary battery or primary battery; or, may be a lithium-ion battery, a lithium-sulfur battery, a sodium-ion battery, a magnesium-ion battery, or the like. The battery cell may be in a shape such as a cylinder, a flat body, a cuboid, or other shapes.

The battery cell is a minimum unit of a battery. The battery cell includes an end cap, a housing, an electrode assembly, and other functional components. The housing of a battery cell may contain one or more electrode assemblies.

The end cap is a component that fits and covers the opening of the housing to isolate the internal environment of the battery cell from the external environment. Not restrictively, the shape of the end cap may be adapted to the shape of the housing to fit the housing. In some embodiments, the end cap may be made of a material of appropriate hardness and strength (such as aluminum alloy), thereby making the end cap not prone to deform in a case of being pressed or impacted, and improving the structural strength and safety performance of the battery cell. Functional components such as electrode terminals may be disposed on the end cap. The electrode terminals may be configured to be electrically connected to the electrode assembly to output or input electrical energy of the battery cell. In some embodiments, the end cap may be equipped with a pressure relief mechanism configured to release an internal pressure when the internal pressure or temperature of the battery cell reaches a threshold. The end cap may also be made of a variety of materials such as copper, iron, aluminum, stainless steel, aluminum alloy, or plastic, and the materials are not particularly limited herein. In some embodiments, an insulator may be further disposed on an inner side of the end cap. The insulator may be configured to isolate an electrically connected component in the housing from the end cap to reduce short-circuit risks. For example, the insulator may be plastic, rubber, or the like.

The housing is a component configured to fit the end cap to form an internal environment of the battery cell. The formed internal environment may be used to accommodate the electrode assembly, an electrolytic solution, and other components. The housing and the end cap may be stand-alone components. An opening may be created on the housing. At the opening, the end cap fits the opening to form an internal environment of the battery cell. Not restrictively, the end cap and the housing may be integrated instead. Specifically, a common junction surface may be formed between the end cap and the housing first before other components are encased in the housing. Subsequently, when the housing needs to be internally sealed, the end cap is made to fit and cover the housing. The housing may vary in shape and size. For example, the housing is cuboidal, cylindrical, hexagonal prismatic, or the like. Specifically, the shape of the housing may be determined depending on the specific shape and size of an electrode assembly. The housing may be made of a variety of materials such as copper, iron, aluminum, stainless steel, aluminum alloy, or plastic, without being particularly limited herein.

The electrode assembly is a component that reacts electrochemically in the battery cell. The housing may contain one or more electrode assemblies. An electrode assembly is primarily formed by winding or stacking a positive electrode plate and a negative electrode plate, and a separator is generally disposed between the positive electrode plate and the negative electrode plate. The parts, coated with an active material, of the positive electrode plate and the negative electrode plate, constitute a body portion of the electrode assembly. The part, coated with no active material, of the positive electrode plate and the negative electrode plate separately, constitutes a tab. The positive tab and the negative tab may be located at one end of the body portion together or at two ends of the body portion respectively. In a charge-and-discharge process of the battery, the positive active material and the negative active material react with an electrolytic solution. The tabs are connected to electrode terminals to form a current circuit.

The battery cell may be in various shapes such as cylindrical, flat, cuboidal or other shapes. The shape of the battery cell is not particularly limited herein. Depending on the form of packaging, the battery cell is typically classed into three types: cylindrical battery cell, prismatic battery cell, and pouch-type battery cell. The type of the battery cell is not particularly limited herein. The battery cell disclosed herein is applicable to, but not limited to use in, electrical devices such as a vehicle, watercraft, or aircraft.

In the battery production process, it is necessary to inject an electrolyte solution as a conductive medium into a housing of a battery cell. Generally, an opening for electrolyte injection is created at one end of the housing of the battery cell. In a process of injecting the electrolyte solution, an injection pump extracts the electrolyte solution and injects the electrolyte solution from the opening into the battery cell through the injection nozzle, and then the opening is sealed. However, currently, the electrolyte solution is injected by using an injection nozzle in the related art, residual electrolyte solution is very prone to adhere to a rubber inner wall of the injection nozzle. The residual electrolyte solution crystalizes to cause electrolyte solution pollution. After the injection stops, the residual electrolyte solution inside the injection nozzle accumulates at the opening at the end portion of the injection nozzle under the effect of gravity. When the gravity of the accumulated electrolyte solution is greater than an adsorption force of the inner wall of the injection nozzle to the electrolyte solution, the electrolyte solution will drip down and adhere to the surface of the battery cell, thereby damaging the battery cell, or even causing cross-pollution to other battery cells, resulting in scrapping of more battery cells, and increasing the reject rate of the batteries.

Based on the above considerations, in order to solve the pollution problem of residual electrolyte solution, the applicant hereof discloses an injection nozzle through in-depth research. In an inner chamber of the body of the injection nozzle, a movable injection pipe is disposed to convey the electrolyte solution. A baffle containing an elastomer is disposed at the outlet of the injection nozzle. The baffle covers the outlet of the injection nozzle. When the electrolyte solution needs to be injected, the injection pipe is moved to prop the baffle open and extended to an injection port created on a housing of the battery cell. After completion of the liquid injection, the injection pipe is moved back and restored to the original position, and the baffle is automatically restored to the state of covering the outlet of the injection nozzle under the elasticity of the elastomer of the baffle. The movable injection pipe prevents the electrolyte solution from adhering to the inner wall of the body of the injection nozzle on the one hand, thereby reducing crystallization of the electrolyte solution and reducing electrolyte solution pollution. On the other hand, after completion of the liquid injection, the residual liquid that accumulates at the end portion of the injection pipe and drips down can be blocked by the baffle that covers the outlet of the injection nozzle, thereby reducing the risk of the residual liquid corroding other objects.

The injection nozzle disclosed in this embodiment of this application is applicable to any scenario in which a liquid needs to be conveyed. Especially, in a case of conveying hazardous liquids (for example, some liquids that are toxic, corrosive, reactive, or polluting), the injection nozzle disclosed in this embodiment of this application can be applied to reduce the risk that the hazardous liquids touches other components or other objects, thereby making the production more standardized, and increasing the yield rate of products.

Figure 2:
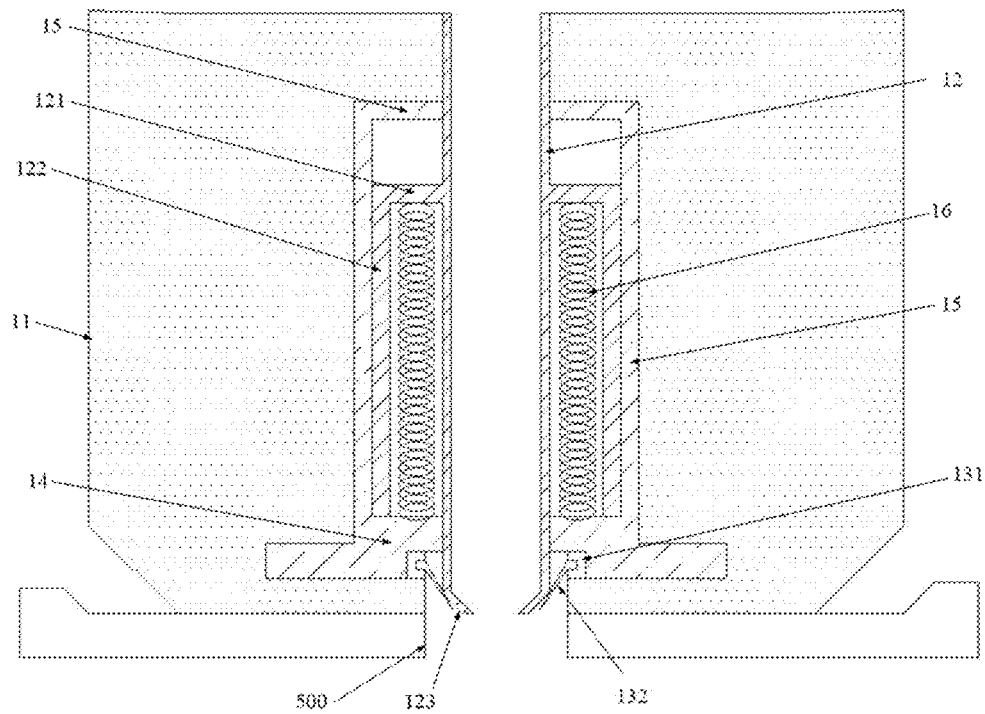
FIG. 2 is another schematic structural diagram of an injection nozzle according to an embodiment of this application.
Figure 3:
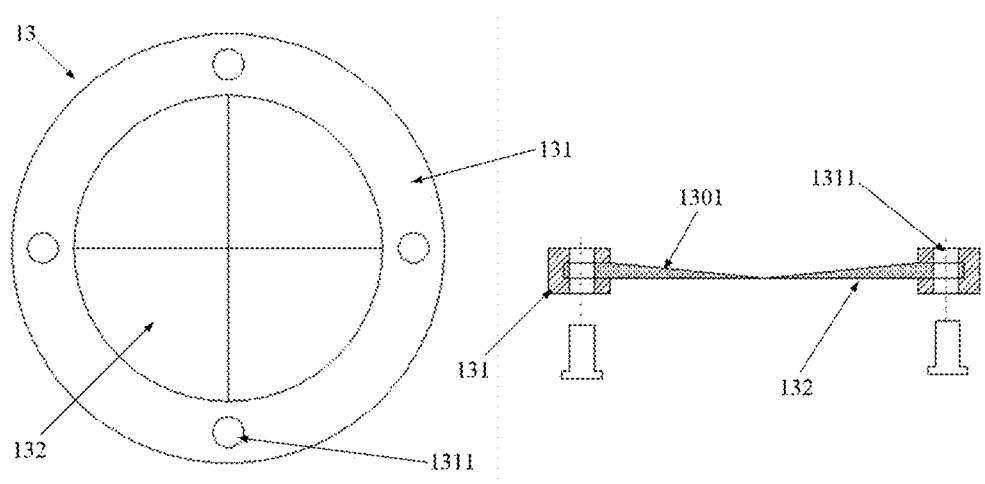
FIG. 3 is a top view and a cross-sectional front view of a baffle according to an embodiment of this application.

In view of this, as shown in FIG. 1 to FIG. 3, an embodiment in a first aspect of this application provides an injection nozzle 10, including a body 11, an injection pipe 12, and a baffle 13. The body 11 contains a channel arranged along a height direction of the injection nozzle 10. A first outlet is disposed at a lower part of the channel. The injection pipe 12 is threaded through the channel in a manner of reciprocating movement along the height direction. The baffle 13 is connected to the body 11 and configured to cover the first outlet when a lower end portion of the injection pipe 12 is higher than the first outlet, and be propped open by the injection pipe 12 when the lower end portion of the injection pipe 12 is lower than the first outlet.

The injection nozzle 10 is an apparatus that fits an injection port 500 of a chamber to be filled and that is configured to convey a liquid-to-be-injected to the injection port 500. For example, in an embodiment of this application, the chamber to be filled may be a cavity formed by the housing of the battery cell. The liquid-to-be-injected is an electrolyte solution suitable for the battery cell. For example, if the battery cell is a lithium-ion battery, main solvents of the electrolyte solution include ethylene carbonate, dimethyl carbonate, ethyl methyl carbonate, diethyl carbonate, and the like. If the battery cell is a lithium-manganese primary battery, the main solvents of the electrolyte solution include propylene carbonate, ethylene glycol dimethyl ether, and the like. The injection port 500 may be understood as an opening created on the housing of the battery cell and configured to inject the liquid-to-be-injected into the chamber to be filled.

The body 11 may be understood as a casing with a hollow space formed in the injection nozzle 10, and is configured to accommodate or connect and mount other components in the injection nozzle 10.

The channel may be understood as a part of the hollow space formed by the body 11, where the part runs through the body 11 until both ends along the height direction of the body.

The first outlet may be understood as an opening located at the lower portion of the channel and leading to the outside of the body 11. The structural shape and dimensions of the first outlet may be the same as or different from the structural shape and dimensions of the channel, and are not particularly limited in this application, as long as at least the dimensions of the first outlet are greater than or equal to the dimensions of the channel to facilitate the injection pipe 12 threaded through the channel to pass through the first outlet smoothly.

The injection pipe 12 may be understood as a hollow cylindrical structure, and the two ends of the injection pipe extending along the height direction of the injection nozzle 10 communicate to each other. In this embodiment of this application, the liquid-to-be-injected can be conveyed from the upper end portion to the lower end portion of the injection pipe by the injection pipe 12.

In the injection nozzle 10 provided in this embodiment in the first aspect of this application, the injection pipe 12 of the injection nozzle can reciprocate in a channel in the body 11 of the injection nozzle along the height direction of the injection nozzle 10. A first outlet is disposed at the lower portion of the channel, and the baffle 13 is connected to the body 11 and configured to cover the first outlet when the lower end portion of the injection pipe 12 is higher than the first outlet and be propped open by the injection pipe 12 when the lower end portion of the injection pipe 12 is lower than the first outlet. In this way, when a liquid needs to be injected, the first outlet of the injection nozzle 10 is aligned with an injection port 500 of the chamber to be filled, and the injection pipe 12 is moved to prop the baffle 13 open, so that the lower end portion of the injection pipe 12 passes from the first outlet out of the body 11, that is, extends to the injection port 500 of the chamber to be filled. The liquid-to-be-injected is conveyed from the upper end portion of the injection pipe 12 to the lower end portion of the injection pipe 12, so as to enter the chamber to be filled and implement the injection of the liquid. After completion of the injection, the injection pipe 12 is moved back so that the lower end portion is restored to the position above the first outlet. At this time, the baffle 13 covers the first outlet to block the residual liquid dripping from the lower end portion of the injection pipe 12, thereby reducing the impact of the residual liquid on the external environment and other objects and reducing pollution. In addition, by conveying the liquidto-be-injected through a movable injection pipe 12, the liquid-to-be-injected is prevented from adhering to the inner wall of the body 11. Especially, for a corrosive liquid-to-be-injected, it is convenient to replace the injection pipe with an injection pipe 12 made of an appropriate material, thereby enhancing versatility and maintainability of the injection nozzle 10.

In some embodiments of this application, as shown in FIG. 1 and FIG. 2, the injection nozzle 10 further includes a spring 16. The spring 16 is disposed between the injection pipe 12 and the body 11 along an axial direction of the injection pipe 12 and is configured to elastically deform when the injection pipe 12 moves downward relative to the body 11.

The spring 16 is a component made of an elastic material (such as spring steel), and deforms elastically when subjected to an external force and returns to the original state due to inherent elasticity when the external force is removed.

By disposing the spring 16 between the injection pipe 12 and the body 11 along the axial direction of the injection pipe 12, when a liquid needs to be injected, a force is applied to the injection pipe 12, so that the injection pipe 12 overcomes the elastic force of the spring 16 and moves downward to prop the baffle 13 open. At this time, the lower end portion of the injection pipe 12 extends from the first outlet to the injection port 500 of the chamber-to-be-filled to implement the injection. After completion of the injection, the force applied to the injection pipe 12 is canceled, so that the spring 16 is restored to the original state due to elasticity. At the same time, the spring drives the injection pipe 12 to move upward to automatically restore the injection pipe 12 to the original position. In this way, the operation of the injection process is simpler. The quick restoration of the injection pipe 12 to the original position can more effectively reduce the risk that the residual liquid accumulated at the lower end portion of the injection pipe 12 drips down onto other objects.

In some embodiments of this application, as shown in FIG. 1 and FIG. 2, the injection nozzle 10 further includes a first extension portion 121 connected to the injection pipe 12. The first extension portion 121 extends outward to the wall of the injection pipe 12 along the diameter direction of the injection pipe 12. The first extension portion 121 is connected to one end of the spring 16.

The first extension portion 121 may be understood as a structure disposed outside the wall of the injection pipe 12 by being perpendicular to the axis of the injection pipe 12. The first extension portion 121 is of some hardness and strength. For example, the first extension portion may be a plate structure made of a metal material, so as to provide, during the downward movement of the injection pipe 12, a reaction force to overcome the work done by the elastic force of the spring 16.

The first extension portion 121, which extends outward to the wall of the injection pipe 12 along the diameter direction of the injection pipe 12, is connected to one end of the spring 16, and the first extension portion 121 is perpendicular to the axis of the injection pipe 12. In this way, it is more convenient to mount the spring 16 and position the spring 16 between the injection pipe 12 and the body 11 along the axial direction of the injection pipe 12. In addition, during the downward movement of the injection pipe 12 relative to the body 11, the first extension portion 121 is able to exert a pressure or tension on the spring 16 connected to the first extension portion, so as to deform the spring 16 elastically.

In some embodiments of this application, as shown in FIG. 1 and FIG. 2, the injection nozzle 10 further includes a fixed base 14 disposed opposite to the first extension portion 121. The fixed base 14 is fixed to the body 11 and connected to another end of the spring 16.

The fixed base 14, located in a fixed position, may be understood as a component playing a connection role for two or more components and a supporting role for some components.

By disposing the fixed base 14 opposite to the first extension portion 121, the other end of the spring 16 is connected to the fixed base 14. Because the fixed base 14 is fixed to the body 11 and immovable, when a force is applied to the injection pipe 12 to move the injection pipe 12 downward, the first extension portion 121 drives an end of the spring 16 connected to the first extension portion 121 to move toward (or away from) the fixed base 14, so as to compress (or stretch) the spring 16 to deform the spring 16 elastically. For example, if the fixed base 14 is disposed on the lower side that is directly opposite to the first extension portion 121, the first extension portion 121 exerts a pressure on the spring 16 when the injection pipe 12 moves downward, so that the spring 16 is compressed between the first extension portion 121 and the fixed base 14. When the external force is removed, one end of the spring 16 rebounds upward against the first extension portion 121, so that the injection pipe 12 moves upward and returns to the original position. The original position may be understood as a position of the injection pipe 12 when the spring 16 is in its original state (without deforming elastically) or is not driven by an external force.

In some embodiments of this application, as shown in FIG. 1 and FIG. 2, the injection nozzle 10 further includes a second extension portion 122. One end of the second extension portion 122 is connected to the first extension portion 121. Another end of the second extension portion 122 is configured to touch the fixed base 14 after the injection pipe 12 moves downward for a preset distance.

The preset distance is a preset maximum stroke within which the injection pipe 12 is movable. When the spring 16 is not deformed elastically, the maximum distance between the other end of the second extension portion 122 and the fixed base 14 along the axial direction of the injection pipe 12 is equal to the preset distance.

The second extension portion 122 may be understood as a structure that extends downward from an end of the first extension portion 121 along the axis of the injection pipe 12, the end being away from the wall of the injection pipe 12. In this case, the fixed base 14 is positioned below the first extension portion 121, and the length of the second extension portion 122 is set according to the preset distance and the position of the fixed base 14. The second extension portion 122 and the first extension portion 121 may be formed in one piece by the same material, and the first extension portion 121 and the injection pipe 12 may be formed in one piece.

The second extension portion 122 can fix the distance of downward movement of the injection pipe 12. The position of the lower end portion of the injection pipe extending to the injection port 500 is fixed as soon as the other end of the second extension portion 122 touches the fixed base 14, that is, as soon as the lower end portion of the injection pipe 12 props the baffle 13 open, thereby preventing an excessive length by which the injection pipe 12 extends to the injection port 500. The excessive length of extension causes the wall of the injection pipe 12 to touch the liquid-to-be-injected or touch the injection port 500.

In some embodiments of this application, as shown in FIG. 1 and FIG. 2, the injection nozzle 10 further includes a limiting cylinder 15. The limiting cylinder 15 is disposed in the body 11 and configured to touch the wall of the injection pipe 12 and/or a sidewall of the second extension portion 122.

The limiting cylinder 15 may be understood as a cylindrical structure configured to control a component to keep moving rectilinearly in a correct direction and formed around the correct direction. For example, in an embodiment of this application, as shown in FIG. 1, the limiting cylinder 15 may include a first limiting portion 151 disposed around the axis of the injection pipe 12, and a second limiting portion 152 disposed perpendicular to the first limiting portion 151. The sidewall of the first limiting portion 151 may touch the sidewall of the second extension portion. The second limiting portion 152 is designed to touch the wall of the injection pipe 12. In this way, when the injection pipe 12 moves rectilinearly along the height direction of the injection nozzle 10 (that is, the axial direction of the injection pipe 12), the first limiting portion 151 and the second limiting portion 152 can simultaneously restrict the injection pipe 12 from wobbling radially.

Evidently, by disposing the limiting cylinder 15 in the body 11 and letting the limiting cylinder touch the wall of the injection pipe 12 and/or the sidewall of the second extension portion 122, the steadiness of the reciprocating movement of the injection pipe 12 along the height direction of the injection nozzle 10 is improved, thereby preventing the lower end portion of the injection pipe 12 from scratching the sidewall of the injection port 500 due to wobbling after extending to the injection port 500.

In some embodiments of this application, as shown in FIG. 1, the limiting cylinder 15 is further configured to touch the first extension portion 121.

In some embodiments, an end of the first limiting portion 151, away from the second limiting portion 152, may be connected to the fixed base 14. The length of the first limiting portion 151 is determined based on the position of the fixed base 14 and the position at which the first extension portion 121 is located when the injection pipe 12 is not driven by an external force. In this way, the second limiting portion 152 is positioned above the position at which the first extension portion 121 is located when the injection pipe 12 is not driven by an external force, and is just in contact with the first extension portion 121. In this way, when the spring 16 is compressed between the first extension portion 121 and the fixed base 14, after the external force applied to the injection pipe 12 is removed, one end of the spring 16 props the first extension portion 121 to rebound upward. Because the position of the second limiting portion 152 is fixed, the first extension portion 121 stops moving upon touching the second limiting portion 152 during the upward movement. At this time, the injection pipe 12 is restored to the original position.

Evidently, by causing the limiting cylinder 15 to touch the first extension portion 121, the injection pipe 12 can be automatically restored to and reside in the original position more smoothly after the external force applied to the injection pipe 12 is removed.

In some embodiments of this application, as shown in FIG. 1 to FIG. 3, the baffle 13 is detachably connected between the body 11 and the fixed base 14.

Because the baffle 13 is configured to block the residual liquid that drips from the lower end portion of the injection pipe 12, the residual liquid often touches and adheres to the surface of the baffle. Especially, with a corrosive liquid, the baffle 13 is prone to be damaged. Therefore, by connecting the baffle 13 detachably between the body 11 and the fixed base 14, it is more convenient to clean and maintain the baffle 13 and replace the baffle 13.

In some embodiments of this application, as shown in FIG. 3, the baffle 13 includes a fixing ring 131 and a plurality of sectorial elastic sheets 132. A plurality of first through-holes 1311 are created on the fixing ring. Curved edges of the plurality of sectorial elastic sheets 132 are embedded in the fixing ring 131 and connected to the fixing ring 131 by a bolt threaded through the first through-hole 1311. The bolt is also threaded through the body 11 and the fixed base 14.

The fixing ring 131 is a ring-shaped component configured to fix the position of the baffle 13. For example, the fixing ring may be made of metal, and therefore, the fixing ring can be easily fixed and connected to other components without deforming easily, be of specified hardness and strength, and can keep its own position and status unchanged after being fixed and mounted. A ring shape in geometry typically means a circular ring, and may be understood as a solid part that remains after a small concentric disc is removed from a large disc. The ring shape is of relatively high symmetry, and is a centrosymmetric figure that is symmetric around a center, and is also an axisymmetric figure that is symmetric around an infinite number of symmetry axes.

The sectorial elastic sheet 132 may be understood as a sectorial sheet structure capable of deforming elastically and automatically restoring to an original state. The sector means a figure defined by two radii of a central angle and an arc opposite to the central angle. The axis of the injection pipe 12 is caused to align with the center of the fixing ring 131. The curved edges of the plurality of sectorial elastic sheets 132 are embedded in the fixing ring 131 to fill an inner circle of the fixing ring 131 and cover the first outlet. In this way, when the injection pipe 12 moves downward and touches the sectorial elastic sheets 132, the tip portions of the sectorial elastic sheets 132 are prone to be propped open. At the same time, the plurality of sectorial elastic sheets 132 may be propped open simultaneously, and the structure in use is more stable.

The first through-hole 1311 may be understood as a hole that completely runs through a solid portion of the fixing ring 131.

The bolt is a mechanical fastener, and typically includes a head and a rod (a cylinder with external threads). Bolting is a connection manner of detachably fastening two or more components. Among the components to be bolted, a through-hole is generally created on at least one of the components, and a hole with internal threads fitting the external threads of the bolt is created on at least one of the components. In this way, all the components are fastened together by rotating the bolt by use of the fit between the bolt rod and the through-hole as well as the fit between the external threads and the internal threads. By rotating the bolt reversely, the bolt rod is screwed out of the through-hole to disassemble each connected component, thereby facilitating the disassembling and assembling operations. In this embodiment of this application, the bolt is threaded through the body 11, the fixing ring 131, the sectorial elastic sheet 132, and the fixed base 14 at the same time, so as to implement the connection between the sectorial elastic sheet 132 and the fixing ring 131 and detachably connect the baffle 13 between the body 11 and the fixed base 14.

By disposing the fixing ring 131 and the plurality of sectorial elastic sheets 132, on the one hand, it is more convenient to fix the baffle 13 to a position of the body 11 at which the first outlet can be covered. On the other hand, the sectorial elastic sheets 132 of the baffle 13 can be automatically restored to the original state when the lower end portion of the injection pipe 12 moves upward to a position higher than the first outlet. In this way, upon completion of the injection, the injection pipe 12 is restored to the original position, and the baffle 13 is restored to the state of covering the first outlet to block the residual liquid that drips down from the injection pipe 12.

In some embodiments of this application, a diversion portion 123 is disposed on the injection pipe 12. A diameter of the diversion portion 123 decreases gradually along a direction from an upper end portion of the injection pipe 12 to the lower end portion of the injection pipe 12.

The diversion portion 123 may be understood as a portion configured to divert the liquid-to-be-injected in the injection pipe 12. As shown in FIG. 1 and FIG. 2, the diversion portion 123 may be disposed at the lower end portion of the injection pipe 12.

By disposing the diversion portion 123 with a diameter decreasing gradually along the direction from the upper end portion of the injection pipe 12 to the lower end portion of the injection pipe 12, the liquid-to-be-injected in the injection pipe 12 can centrally converge into a thin-diameter liquid column to enter the injection port 500 after flowing top-down to the diversion portion 123, so as to more effectively prevent the liquid-to-be-injected from splashing down onto other components and objects.

In some embodiments of this application, the baffle 13 includes a beveled face 1301 that fits the diversion portion 123.

The beveled face 1301 may be understood as a flat face at an inclination to a plane on the baffle 13, where the inclination is typically an acute angle. For example, as shown in FIG. 3, in this embodiment of this application, the beveled face 1301 may be an upper surface of the sectorial elastic sheet 132, the upper surface being inclined at an angle to the lower surface of the sectorial elastic sheet.

By disposing the beveled face 1301 that fits the diversion portion 123, the injection pipe 12 can touch and fit the baffle 13 and prop the baffle 13 open more easily when the injection pipe 12 moves downward.

In some embodiments of this application, as shown in FIG. 1 to FIG. 3, the injection nozzle 10 includes a body 11, an injection pipe 12, a baffle 13, a fixed base 14, a limiting cylinder 15, and a spring 16. The body 11 includes a channel arranged along the height direction of the injection nozzle 10. A first outlet is created at the lower portion of the channel. The injection pipe 12 is threaded through the channel in a manner of reciprocating along the height direction. The injection pipe 12 includes a first extension portion 121 and a second extension portion 122. The first extension portion 121 is connected to one end of the spring 16. The fixed base is disposed opposite to the first extension portion 121. The fixed base 14 is fixed to the body 11 and connected to the other end of the spring 16. The other end of the second extension portion 122 is configured to touch the fixed base 14 after the injection pipe 12 moves downward for a preset distance. The spring 16 is configured to deform elastically when the injection pipe 12 moves downward relative to the body 11. The limiting cylinder 15 is connected to the fixed base 14 and configured to touch the wall of the injection pipe 12, the upper surface of the first extension portion 121, and the sidewall of the second extension portion 122. The baffle 13 is detachably connected between the body 11 and the fixed base 14, and includes a fixing ring 131 and a plurality of sectorial elastic sheets 132. The curved edges of the plurality of sectorial elastic sheets 132 are embedded in the fixing ring 131, and connected to the fixing ring 131 by the bolt threaded through the first through-hole 1311. The bolt also runs through the body 11 and the fixed base 14. The plurality of sectorial elastic sheets 132 cover the first outlet when the lower end portion of the injection pipe 12 is higher than the first outlet, and are propped open by the injection pipe 12 when the lower end portion of the injection pipe 12 is lower than the first outlet.

In the injection nozzle 10 provided in this embodiment of this application, the injection pipe 12 of the injection nozzle can reciprocate in a channel in the body 11 of the injection nozzle along the height direction of the injection nozzle 10. A first outlet is disposed at the lower portion of the channel, and a plurality of sectorial elastic sheets 132 of the baffle 13 cover the first outlet when the lower end portion of the injection pipe 12 is higher than the first outlet and are propped open by the injection pipe 12 when the lower end portion of the injection pipe 12 is lower than the first outlet. In this way, when a liquid needs to be injected, the first outlet of the injection nozzle 10 is aligned with an injection port 500 of the chamber to be filled, and the injection pipe 12 is moved to prop open the plurality of sectorial elastic sheets 132 of the baffle 13, so that the lower end portion of the injection pipe 12 passes from the first outlet out of the body 11, that is, extends to the injection port 500 of the chamber to be filled. The liquid-to-be-injected is conveyed from the upper end portion of the injection pipe 12 to the lower end portion of the injection pipe 12, so as to enter the chamber to be filled and implement the injection of the liquid. After completion of the injection, the spring 16 is restored to the original state due to elasticity, and drives the injection pipe 12 to move upward to automatically restore the injection pipe 12 to the original position, so that the lower end portion of the injection pipe 12 is restored to the position above the first outlet. At this time, the plurality of sectorial elastic sheets 132 are restored to the original state and cover the first outlet to block the residual liquid dripping from the lower end portion of the injection pipe 12, thereby reducing the impact of the residual liquid on the external environment and other objects and reducing pollution. In addition, by conveying the liquid-to-be-injected through a movable injection pipe 12, the liquid-to-be-injected is prevented from adhering to the inner wall of the body 11. Especially, for a corrosive liquid-to-be-injected, it is convenient to replace the injection pipe with an injection pipe 12 made of an appropriate material, thereby enhancing versatility and maintainability of the injection nozzle 10. By disposing the limiting cylinder 15 that touches the wall of the injection pipe 12 and the sidewalls of the first extension portion 121 and the second extension portion 122, the steadiness of the reciprocating movement of the injection pipe 12 along the height direction of the injection nozzle 10 is improved, thereby preventing the lower end portion of the injection pipe 12 from scratching the sidewall of the injection port 500 due to wobbling after extending to the injection port 500. In addition, the injection pipe 12 can be automatically restored to and reside in the original position more smoothly after the external force applied to the injection pipe 12 is removed. The second extension portion 122 can also fix the distance of downward movement of the injection pipe 12. The position of the lower end portion of the injection pipe extending to the injection port 500 is fixed as soon as the other end of the second extension portion 122 touches the fixed base 14, that is, as soon as the lower end portion of the injection pipe 12 props the baffle 13 open, thereby preventing an excessive length by which the injection pipe 12 extends to the injection port 500. The excessive length of extension causes the wall of the injection pipe 12 to touch the liquid-to-be-injected or touch the injection port 500.

Figure 4:
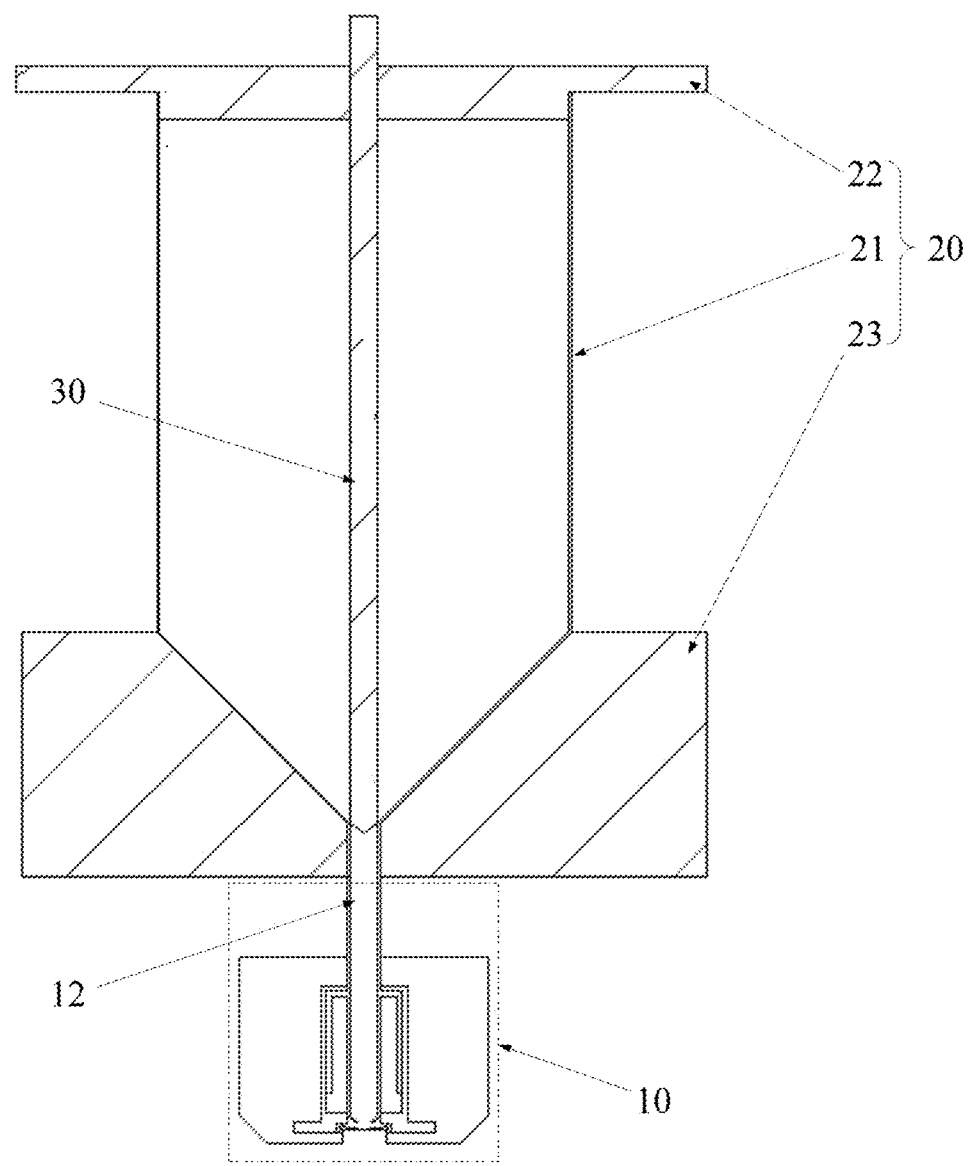
FIG. 4 is a schematic structural diagram of an injection apparatus according to an embodiment of this application.

As shown in FIG. 1 and FIG. 4, an embodiment in a second aspect of this application provides an injection apparatus. The injection apparatus includes the injection nozzle 10 according to an embodiment in the first aspect of this application.

In the injection apparatus 10 provided in this embodiment in the second aspect of this application, the injection pipe 12 of the injection nozzle 10 in the injection apparatus can reciprocate in a channel in the body 11 of the injection nozzle along the height direction of the injection nozzle 10. A first outlet is disposed at the lower portion of the channel, and the baffle 13 is connected to the body 11 and configured to cover the first outlet when the lower end portion of the injection pipe 12 is higher than the first outlet and be propped open by the injection pipe 12 when the lower end portion of the injection pipe 12 is lower than the first outlet. In this way, when a liquid needs to be injected, the first outlet of the injection nozzle 10 is aligned with an injection port 500 of the chamber to be filled, and the injection pipe 12 is driven to prop the baffle 13 open, so that the lower end portion of the injection pipe 12 passes from the first outlet out of the body 11, that is, extends to the injection port 500 of the chamber to be filled. The liquid-to-be-injected is conveyed from the upper end portion of the injection pipe 12 to the lower end portion of the injection pipe 12, so as to enter the chamber to be filled and implement the injection of the liquid. After completion of the injection, the injection pipe 12 is moved back so that the lower end portion is restored to the position above the first outlet. At this time, the baffle 13 covers the first outlet to block the residual liquid dripping from the lower end portion of the injection pipe 12, thereby reducing the impact of the residual liquid on the external environment and other objects and reducing pollution. In addition, by conveying the liquid-to-be-injected through a movable injection pipe 12, the liquid-to-be-injected is prevented from adhering to the inner wall of the body 11. Especially, for a corrosive liquid-to-be-injected, it is convenient to replace the injection pipe with an injection pipe 12 made of an appropriate material, thereby enhancing versatility and maintainability of the injection nozzle 10.

In some embodiments of this application, as shown in FIG. 4, the injection apparatus further includes an injection cup 20, a driving mechanism, and a stopper rod 30. The injection cup 20 includes a chamber 21 configured to accommodate an electrolyte solution, an upper cover 22 disposed at one end of the chamber 21, and a lower cover 23 disposed at another end of the chamber 21. A second through-hole is created on the lower cover 23. The injection pipe 12 of the injection nozzle 10 is fixedly threaded through the second through-hole and communicates with the chamber 21. A third through-hole is created on the upper cover 22. The driving mechanism is configured to drive the injection cup 20 to move from a first position to a second position. The stopper rod 30 is fixed in a position and threaded through the third through-hole. One end of the stopper rod 30 is configured to be in close contact with an upper end portion of the injection pipe 12 and, when the injection cup 20 reaches the second position, be disengaged from the injection pipe 12.

The injection cup 20 may be understood as a container configured to store the liquid-to-be-injected and, during an injection operation, provide the liquid-to-be-injected to the injection pipe 12.

The chamber 21 may be understood as a hollowed-out structure configured to isolate the liquid-to-be-injected from the outside.

The upper cover 22 may be understood as a structure that fits the top of the chamber 21 in the height direction of the injection apparatus and that is configured to cover the top of the chamber 21 and be connected to other components.

The lower cover 23 may be understood as a structure that fits the bottom of the chamber 21 in the height direction of the injection apparatus and that is configured to cover the bottom of the chamber 21 and be connected to other components.

The second through-hole may be understood as a hole that completely runs through the lower cover 23 along the height direction of the injection apparatus.

The third through-hole may be understood as a hole that completely runs through the upper cover 22 along the height direction of the injection apparatus.

The driving mechanism may be understood as an apparatus capable of providing a power source and transmitting the power, so as to drive other movable components or machines to move in a desired manner of movement. In this embodiment of this application, the driving mechanism may be understood as an apparatus that drives the injection cup 20 to move downward along the height direction of the injection apparatus.

The first position may be understood as a position of the injection cup 20 in the height direction without being driven by the driving mechanism. The second position may be understood as a position of the injection cup 20 in the height direction when the lower end portion of the injection pipe 12 is in a desired position after propping the baffle 13 open. The position in the height direction means a spatial point along the height direction of the injection apparatus. The desired position means a position at which the lowest point of the lower end portion of the injection pipe 12 resides when the liquid-to-be-injected flowing out can just enter the injection port 500 after the injection pipe 12 moves downward and props the baffle 13 open. For example, in this embodiment of this application, as shown in FIG. 2, the lowest point of the lower end portion of the injection pipe 12 is flush with the upper surface of the injection port 500 after the injection pipe 12 moves downward and props the baffle 13 open. In this way, it is avoided that the lower end portion of the injection pipe 12 is excessively high over the injection port 500 and thereby makes the liquid-to-be-injected prone to be splashed onto the outside of the injection port 500 or other objects, and in turn, results in waste and pollution. It is also avoided that the injection pipe 12 extends to the injection port 500 for an excessive length that causes the wall of the injection pipe 12 to touch the liquid-to-be-injected or touch the injection port 500.

The stopper rod 30 may be understood as an elongated structure extending along the height direction of the injection apparatus.

By disposing the injection cup 20, the driving mechanism, and the stopper rod 30, when the driving mechanism is not driving the injection cup 20, the stopper rod 30 is in close contact with the upper end portion of the injection pipe 12, so that the liquid-to-be-injected in the chamber 21 of the injection cup 20 is unable to flow into the injection pipe 12. When the driving mechanism drives the injection cup 20 until the injection cup 20 reaches the second position, the injection cup 20 accordingly drives the injection pipe 12 to move downward until the lower end portion reaches a desired position, where the injection pipe is fixedly threaded through the lower cover 23 of the injection cup. At this time, the stopper rod 30 is disengaged from the injection pipe 12, the injection pipe 12 communicates with the chamber 21, and the liquid-to-be-injected flows downward from the upper end portion to the lower end portion of the injection pipe 12 to enter the injection port 500, thereby implementing the liquid injection.

The foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

It is hereby noted that the relational terms herein such as first and second are used only to differentiate an entity or operation from another entity or operation, and do not require or imply any actual relationship or sequence between the entities or operations. Moreover, the terms "include", "comprise", and any variation thereof are intended to cover a non-exclusive inclusion relationship in which a process, method, object, or device that includes or comprises a series of elements not only includes such elements, but also includes other elements not expressly specified or also includes inherent elements of the process, method, object, or device. Unless otherwise specified in the context, reference to a process, method, object, or device that "includes" or "comprises" a specific number of elements does not exclude other identical or equivalent elements existent in the process, method, object, or device.

Different embodiments of this application are described in a correlative manner. For the same or similar part in one embodiment, reference may be made to another embodiment. Each embodiment focuses on differences from other embodiments.

What is described above is merely preferred embodiments of this application, but not intended to limit the protection scope of this application. Any and all modifications, equivalent replacements, improvements, and the like made without departing from the spirit and principles of this application still fall within the protection scope of this application.

What is claimed is:

1. An injection nozzle for injecting an electrolyte solution into a battery cell, comprising:
   a body, containing a channel arranged along a height direction of the injection nozzle, wherein a first outlet is disposed at a lower part of the channel;
   an injection pipe configured to inject the electrolyte solution, the injection pipe threaded through the channel in a manner of reciprocating movement along the height direction; and
   a baffle, connected to the body and configured to cover the first outlet when a lower end portion of the injection pipe is higher than the first outlet to block a residual liquid of the electrolyte solution dripping from the lower end portion of the injection pipe, and be propped open by the injection pipe when the lower end portion of the injection pipe is lower than the first outlet to allow the electrolyte solution to be conveyed from an upper end portion of the injection pipe to the lower end portion of the injection pipe,
   wherein the baffle comprises a plurality of sectorial elastic sheets capable of deforming elastically, the sectorial elastic sheets each have a beveled face and a tip portion, the beveled face is a flat face at an inclination to a plane on the baffle, when the injection pipe moves downward and touches the sectorial elastic sheets, the sectorial elastic sheets are deformed and the tip portions of the sectorial elastic sheets are propped open.

2. The injection nozzle according to claim 1, wherein the injection nozzle further comprises a spring, the spring is disposed between the injection pipe and the body along an axial direction of the injection pipe and is configured to elastically deform when the injection pipe moves downward relative to the body.

3. The injection nozzle according to claim 2, wherein the injection nozzle further comprises a first extension portion connected to the injection pipe, the first extension portion extends outward to a wall of the injection pipe along a diameter direction of the injection pipe, and the first extension portion is connected to one end of the spring.

4. The injection nozzle according to claim 3, wherein the injection nozzle further comprises a fixed base disposed opposite to the first extension portion, and the fixed base is fixed to the body and connected to another end of the spring.

5. The injection nozzle according to claim 4, wherein the injection nozzle further comprises a second extension portion, one end of the second extension portion is connected to the first extension portion, and another end of the second extension portion is configured to touch the fixed base after the injection pipe moves downward for a preset distance.

6. The injection nozzle according to claim 5, wherein the injection nozzle further comprises a limiting cylinder, the limiting cylinder is disposed in the body and configured to touch the wall of the injection pipe and/or a sidewall of the second extension portion.

7. The injection nozzle according to claim 6, wherein the limiting cylinder is further configured to touch the first extension portion.

8. The injection nozzle according to claim 4, wherein the baffle is detachably connected between the body and the fixed base.

9. The injection nozzle according to claim 8, wherein the baffle further comprises a fixing ring, a plurality of first through-holes are created on the fixing ring, curved edges of the plurality of sectorial elastic sheets are embedded in the fixing ring and connected to the fixing ring by a bolt threaded through the first through-hole, and the bolt is also threaded through the body and the fixed base.

10. The injection nozzle according to claim 1, wherein a diversion portion is disposed on the injection pipe, and a diameter of the diversion portion decreases gradually along a direction from the upper end portion of the injection pipe to the lower end portion of the injection pipe.

11. The injection nozzle according to claim 10, wherein the baffle comprises a beveled face that fits the diversion portion.

12. An injection apparatus, comprising the injection nozzle according to claim 1.

13. The injection apparatus according to claim 12, wherein the injection apparatus further comprises:
   an injection cup, wherein the injection cup comprises a chamber configured to accommodate the electrolyte solution, an upper cover disposed at one end of the chamber, and a lower cover disposed at another end of the chamber; a second through-hole is created on the lower cover, the injection pipe of the injection nozzle is fixedly threaded through the second through-hole and communicates with the chamber, and a third through-hole is created on the upper cover;

a driving mechanism, wherein the driving mechanism is configured to drive the injection cup to move from a first position to a second position; and a stopper rod, wherein the stopper rod is fixed in a position and threaded through the third through-hole, and one end of the stopper rod is configured to be in close contact with the upper end portion of the injection pipe and, when the injection cup reaches the second position, be disengaged from the injection pipe.

* * * * *